July 1, 1941.   T. R. LYMAN   2,248,005
AUTOMATIC COUPLING DEVICE
Filed Nov. 6, 1940   2 Sheets-Sheet 1
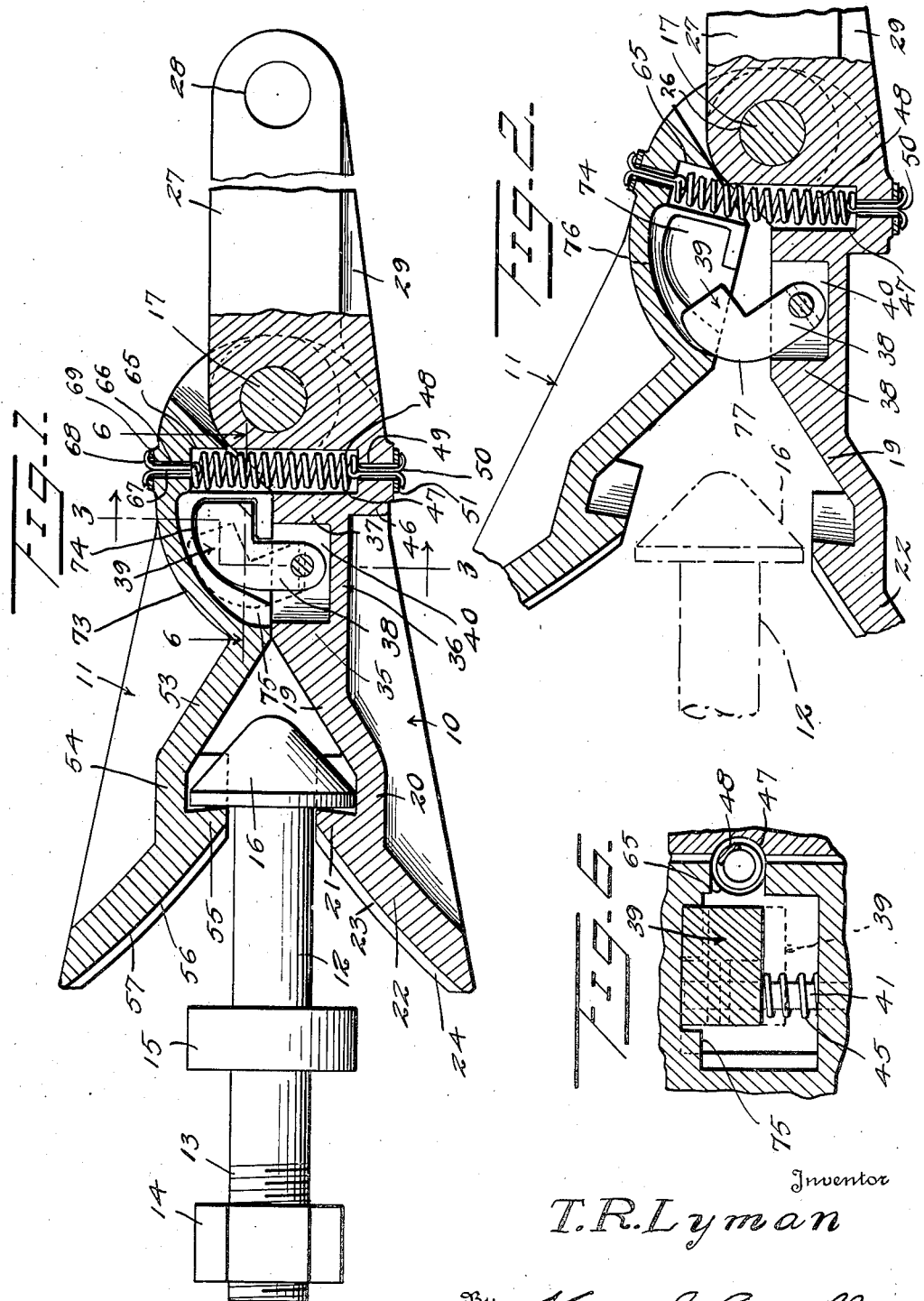
Inventor
T. R. Lyman
By Kimmel & Crowell
Attorneys July 1, 1941.  T. R. LYMAN  2,248,005
AUTOMATIC COUPLING DEVICE
Filed Nov. 6, 1940  2 Sheets-Sheet 2
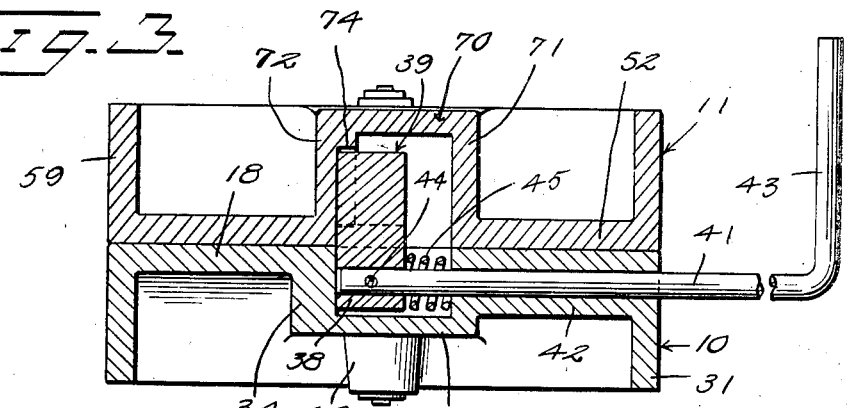
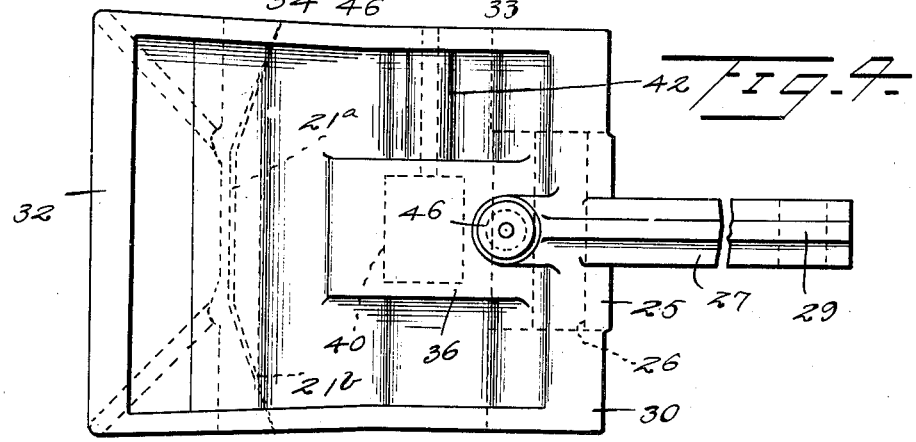
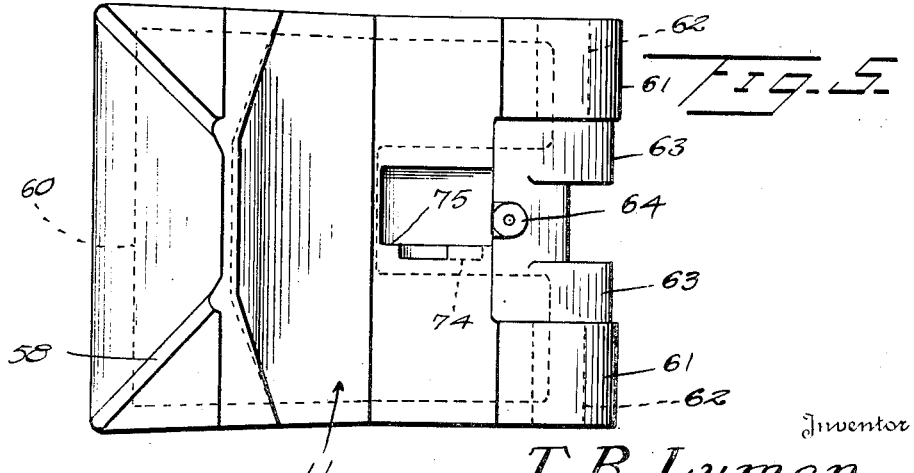
Inventor
T. R. Lyman
By Kimmel & Crowell
Attorneys Patented July 1, 1941

2,248,005

UNITED STATES PATENT OFFICE 2,248,005

AUTOMATIC COUPLING DEVICE

Theodore Richard Lyman, Great Falls, Mont., assignor of sixty per cent to A. D. Rieder, Neihart, Mont.

Application November 6, 1940, Serial No. 364,576

4 Claims. (Cl. 280—33.15)

This invention relates to coupling devices and more particularly to a device for automatically coupling a tractor structure to a trailer structure.

This invention is an improvement over the structure embodied in my Patent No. 2,124,467 which issued July 19, 1938.

An object of this invention is to provide a coupling device for coupling an implement to a tractor or for coupling a pair of tractors or other vehicles together which is automatic in its coupling action and which may be manually locked so that the coupling device will not become uncoupled when the vehicles move over uneven ground.

Another object of this invention is to provide a coupling device of this kind wherein the coupling bolt or tongue may have swinging movement relative to the bolt holding jaws to thereby relieve the bolt from any twisting strain.

A further object of this invention is to provide a coupling device of this kind in which the manually operated locking means also constitutes a releasing means for positively opening the bolt or drawbar holding jaws in order that the bolt may be separated therefrom.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings—

Figure 1 is a longitudinal section partly in detail of an automatic coupling device constructed according to an embodiment of this invention.

Figure 2 is a fragmentary longitudinal section of the device in open position.

Figure 3 is a transverse sectional view taken on the line 3—3 of Figure 1.

Figure 4 is a plan view of one of the coupling jaws.

Figure 5 is a plan view of the other of the coupling jaws.

Figure 6 is a fragmentary sectional view taken on the line 6—6 of Figure 1.

Referring to the drawings, the numerals 10 and 11 designate generally a pair of coupling jaws and the numeral 12 designates a drawbar member which is adapted to be connected to a tractor or other power means, the drawbar 12 being provided with a threaded forward portion 13 on which a nut 14 is threaded. The drawbar 12 is also provided with a fixed collar 15 intermediate the ends thereof and at the rear end the drawbar 12 is provided with a substantially conical head 16. The coupling jaw 10 is the lower or stationary coupling jaw and the coupling jaw 11 is the upper or movable coupling jaw which is pivotally secured to the lower jaw 10 by means of a shaft or coupling pin 17.

The lower or stationary coupling jaw 10 comprises a substantially flat rear part 18, a downwardly inclined keeper wall 19 which extends downwardly and forwardly from the rear body part 18 and the keeper wall 19 merges at its lower forward end with a horizontal disposed keeper wall 20. A forward keeper wall 21 extends upwardly from and has the rear face thereof inclined upwardly and rearwardly with respect to the upper surface of the lower keeper wall 20. A forwardly and downwardly inclined drawbar head guiding member 22 extends forwardly and downwardly from the forward keeper wall 21 and is provided with an upper convex surface 23.

The convex surface 23 has formed integral therewith a pair of rearwardly convergent head guiding beads 24 which at their rear or inner ends terminate at the opposite ends of an intermediate keeper part 21$^a$ which is disposed in parallel relation with the transverse axis of the jaw 10. The keeper wall 21 is also formed at the opposite ends of the intermediate part 21$^a$ with a pair of rearwardly divergent parts 21$^b$ so that when the head 17 is engaged between the two jaws 10 and 11, the rearwardly divergent or forwardly convergent parts 21$^b$ of the keeper 21 will tend to position the head 16 centrally of the two jaws 10 and 11.

The rearward inclination of the opposite end portions 21$^b$ of the keeper 21 also provides a means whereby the head 16 may slide laterally with respect to the longitudinal axes of the jaws 10 and 11 and at the same time have the forward side thereof in flat contact with the confronting sides of the keeper 21. The jaw 10 has formed integral with the rear portion thereof a substantially cylindrical bearing 25 formed with a bore 26 through which the shaft or pin 17 pivotally engages. A rearwardly extending shank or tongue 27 is formed integral with the bearing 25 and the shank 27 adjacent the rear thereof is provided with an opening 28 through which an attaching bolt or other fastening means is adapted to engage for attaching the shank 27 onto a trailer vehicle.

A bracing web 29 is carried by the lower surface of the shank 27 and provides a means for bracing the shank 27 against longitudinal bending. The jaw 10 is also provided at the opposite ends of the bearing 25 with a pair of transversely arcuate webs 30, the purpose for which will be hereinafter described.

The jaw 10 is provided about the marginal edges thereof with side flanges 31 and with a forward flange 32. The jaw 10 at a point forwardly from the bearing 25 is also provided with one part of a dog housing, the housing part being formed integral with the rear flat part 18 and comprising a lower wall 33 and side walls 34. The front wall 35 of the housing generally designated as 36 merges with the forwardly and downwardly inclined keeper wall 19 and the rear wall 37 of the housing 36 is formed integral with and is disposed forwardly from the bearing 25. A shank 38 of a dog generally designated as 39 is adapted to be rockably mounted in the housing chamber 40 and is secured to a dog operating shaft 41 which is journalled in a boss 42 carried by and extending downwardly from a flat rear part 18 of the jaw 10. The shaft 41 at its outer end is formed with an angularly disposed handle or operator 43 so that the shaft 41 may be manually rocked to either lock the upper jaw 11 as will be hereinafter described or to swing the dog 39 in order to rock the upper jaw 11 relative to the lower jaw 10 as shown in Figure 2.

The shaft 41 is secured to the shank 38 of the dog 39 by means of a pin or key 44 and a spring 45 is positioned loosely about the shaft 41 in the chamber 40 and one end of the spring 45 bears against the adjacent side wall 34 of the housing 36 whereas the opposite end of the spring 45 bears against the adjacent side of the shank 38.

The lower jaw 10 is also provided adjacent the rear thereof with a boss 46 and the boss 46 is provided with a spring receiving bore 47 in which a spring 48 is adapted to engage. The boss 46 is also formed with a counterbore 49 of smaller diameter than the bore 47 and a cotter pin 50 or other fastening means is adapted to extend through the counterbore 49 and is adapted to have the looped end thereof engaged about one end of the spring 48. The free ends of the cotter pin 50 are adapted to be bent laterally as shown in Figure 1 and a washer 51 may be positioned about the cotter pin 50 between the bent outer portions thereof and the outer end of the boss 46 as shown in Figure 1.

The jaw 11 is of substantially the same configuration as the jaw 10 being provided with a flat rear part 52 confronting the flat rear part 18 of the jaw 10 and keeper walls 53 and 54 extend from the forward edge of the flat wall 18 and are disposed in opposed relation to the walls 19 and 20. In other words, the wall 18 is inclined upwardly and forwardly and the wall 54 is disposed in parallel relation to and in confronting relation with respect to the horizontal wall 20.

A forward keeper wall 55 is formed integral with the wall 54 and has a configuration similar in every detail to the keeper wall 21. A forwardly and upwardly inclined drawbar head guiding member 56 which is formed with a convex forward surface 57 extends from the keeper wall 55 and a pair of forwardly divergent beads 58 are formed integral with the convex surface 57.

The movable jaw 11 is provided with upwardly extending side flanges 59 and with a forward bracing flange 60. The jaw 11 at the rear thereof is provided with a pair of spaced apart axially aligned bearing members 61 which are provided with a bore 62 for receiving the coupling shaft 17. The webs 30 are adapted to loosely engage about the bearings 61 so that these webs 30 will form a protecting means for the bearings 61. The bearings 61 at their inner ends are provided with a pair of protecting webs 63 of transversely arcuate configuration which loosely engage about the bearing 25 on opposite sides of the shank 27.

The jaw 11 is provided at a point between the bearings 61 with a boss 64 and the boss 64 as shown in Figure 1 is provided with a bore 65 in which a portion of the spring 48 is adapted to engage. The boss 64 is also provided with a counterbore 66 in which a cotter pin 67 engages. The looped end of the cotter pin 67 is adapted to engage about the adjacent end of the spring 48 and the outer or free ends of the cotter pin 67 are adapted to be bent over in opposed relation as at 68 and a washer 69 is loosely positioned about the cotter pin 67 and is disposed between the bent portion 68 and the outer end of the boss 64. The spring 48 is adapted to constantly urge the movable jaw 11 in the direction of the stationary jaw 10.

The dog 39 is adapted to extend outwardly into an upper housing member 70 which is carried by the movable jaw 11 and this upper housing member 70 is adapted to confront the lower housing member 36. The upper housing member 70 is provided with opposite side walls 71 and 72 and a longitudinal arcuate upper wall 73. The side wall 72 of the housing 70 has formed therein a dog receiving recess 74 which constitutes a keeper, the spring 45 being arranged to constantly urge the dog 39 in the direction of the keeper or recess 74. The side wall 72 at a point forwardly from the keeper 74 constitutes an abutment 75 against which the adjacent face of the dog 39 is adapted to engage, as shown in dotted lines in Figure 1 in order that the dog 39 may be held in a released position with respect to the keeper 74, being held in such position by the spring 43 and which will permit the free upward swinging of the upper jaw 11 during the coupling operation. The inner arcuate surface 76 of the housing wall 73 comprises a concave cam against which the cam portion 77 of the L-shaped dog 39 is adapted to engage when the L-dog 39 is rocked forwardly to the position shown in Figure 2. The engagement of the cam part 77 of the dog 39 with the concave cam 76 is adapted to forcibly swing the upper jaw 11 to an open or drawbar head releasing position.

In the use and operation of this coupling device, the drawbar 12 is adapted to be secured to a tractor vehicle and the shank 27 is adapted to be secured to a trailer vehicle. The trailer vehicle may be in the form of a second tractor, a farm implement or other device which it is adapted to pull by the tractor vehicle. The jaw 10 is positioned with the upper face thereof horizontal and initially the dog 39 is pulled laterally or to the right as viewed in Figure 3 until the dog 39 is out of engagement with the keeper 74. The handle 43 is then rocked forwardly so as to position the dog 39 against the abutment 75 and out of registry with the keeper 74. The tractor vehicle may then be backed in the direction of the coupling device with the two jaws 10 and 11 in closed position but in a position whereby the upper jaw 11 may be freely swung upwardly when the coupling head 16 strikes the two jaws 10 and 11.

The tapered or reduced end of the head 16 is rearmost and will force the two jaws 10 and 11 apart, the jaw 11 swinging upwardly and when the head 16 passes the keeper walls 21 and 55, the spring 48 will swing the upper jaw 11 downwardly to a coupling position. This is the position shown in full lines in Figure 1. At this time the dog 39 may be rocked rearwardly from the dotted line position until the dog 39 is in registry with the keeper 74. The spring 45 will then shift the dog 39 laterally or to the left as viewed in Figure 3 so as to move the dog 39 into engagement with the keeper 74.

In this latter position, the two jaws 10 and 11 are locked together so that the drawbar head 16 will not swing the coupling jaws apart during any movement of the two vehicles over rough ground which in prior devices has had the tendency to release the trailing vehicle from the tractor vehicle.

When it is desired to release the drawbar head 16 from between the coupling jaws 10 and 11, the handle 43 is pulled manually to the right as viewed in Figure 3 so as to release the dog 39 from the keeper 74. The handle 43 is then rocked forwardly so that the cam member 77 thereof will slide over the concave cam member 76 which is carried by the upper jaw 11. The dog 39 may be rocked forwardly to the limit permitted by the forward wall 35 of the lower housing 36 and at this time the upper jaw 11 will be in the released position shown in Figure 2. In this released position the two draw bar head keepers 21 and 55 will be spaced apart sufficiently to permit the free removal of the drawbar head 16.

A coupling device constructed according to this invention may be subjected to extremely hard and rough usage and will securely hold the trailer vehicle to the tractor vehicle until the locking dog 39 has been moved to a released position.

What I claim is:

1. In a coupling device including a pair of pivoted coupling jaws, a combined jaw locking and opening dog, means pivotally mounting said dog in one of said jaws, a keeper carried by the other jaw engageable with said dog in one position of the latter for locking the jaws together, correlated means carried by said one jaw and said dog for holding said jaws in open position when said dog is in another position, and a manual operator connected with said dog.

2. In a coupling device including a pair of pivoted coupling jaws, a combined jaw locking and opening dog, means pivotally mounting said dog in one of said jaws, a keeper carried by the other jaw engageable with said dog in one position of the latter for locking the jaws together, correlated means carried by said one jaw and said dog for holding said jaws in open position when said dog is in another position, a manual operater connected with said dog, and means constantly urging said dog in the direction of said keeper.

3. In a coupling device including a pair of spring-pressed pivoted coupling jaws; a combined jaw locking and opening dog, a dog operator shaft pivotally mounted in one jaw and fixed to said dog, a keeper carried by the other jaw and engageable with said dog in one position of the latter for locking said jaws together, means constantly urging said dog in the direction of said keeper, an abutment carried by said other jaw forwardly of said keeper and engageable with said dog in another position for holding said dog in a jaw releasing position, and correlated means carried by said dog and said other jaw for positively swinging one of said jaws to an open released position.

4. In a coupling device including a pair of spring-pressed pivoted coupling jaws; a combined jaw locking and opening dog, a dog operator shaft pivotally mounted in one jaw and fixed to said dog, a keeper carried by the other jaw and engageable with said dog in one position of the latter for locking said jaws together, means constantly urging said dog in the direction of said keeper, an abutment carried by said other jaw forwardly of said keeper and engageable with said dog in another position for holding said dog in a jaw releasing position, correlated means carried by said dog and said other jaw for positively swinging one of said jaws to an open released position, said correlated means comprising a concave cam face fixed relative to said other jaw, and a convex cam face carried by said dog.

THEODORE RICHARD LYMAN.